United States Patent [19]
Yamazaki

[11] Patent Number: 5,655,134
[45] Date of Patent: Aug. 5, 1997

[54] NETWORK STRUCTURE STORING AND RETRIEVAL METHOD FOR A DATA PROCESSOR

[75] Inventor: Yasushi Yamazaki, Kawasaki, Japan

[73] Assignee: Fujitsu Limited, Kawasaki, Japan

[21] Appl. No.: 274,372

[22] Filed: Jul. 13, 1994

Related U.S. Application Data

[63] Continuation of Ser. No. 813,744, Dec. 30, 1991, abandoned.

[30] Foreign Application Priority Data

Dec. 28, 1990 [JP] Japan ................... 2-416847

[51] Int. Cl.⁶ ................................ G06F 13/14
[52] U.S. Cl. ............... 395/800.01; 395/200.56; 395/200.68; 364/DIG. 1; 364/242.94; 364/254.6
[58] Field of Search .................. 395/200, 800, 395/275, 365, 725, 200.1, 200.15; 370/60, 94.1

[56] References Cited

U.S. PATENT DOCUMENTS

| | | | |
|---|---|---|---|
| 4,466,060 | 8/1984 | Riddle | 395/325 |
| 4,825,206 | 4/1989 | Brice, Jr. et al. | 370/94 |
| 4,864,559 | 9/1989 | Perlman | 370/60 |
| 4,875,208 | 10/1989 | Furuhashi et al. | 370/94.1 |
| 4,956,791 | 9/1990 | Lee et al. | 395/51 |
| 4,967,345 | 10/1990 | Clarke et al. | 364/514 |
| 5,007,052 | 4/1991 | Flammer | 370/85.6 |
| 5,008,882 | 4/1991 | Peterson et al. | 370/94.3 |
| 5,031,093 | 7/1991 | Hasegawa | 395/200 |
| 5,040,127 | 8/1991 | Gerson | 395/2.64 |
| 5,128,926 | 7/1992 | Perlman et al. | 370/54 |
| 5,241,682 | 8/1993 | Bryant et al. | 395/800 |
| 5,321,815 | 6/1994 | Bartolanzo, Jr. et al. | 395/200 |

*Primary Examiner*—Mehmet B. Geckil
*Attorney, Agent, or Firm*—Staas & Halsey

[57] ABSTRACT

A link information storer stores link connection information and a node information storer stores node label information by sequentially searching links from the beginning of a network when data in a network structure are configured by linking nodes according to the relations among nodes (N), which represent basic units of data. The link information storer stores a previous or next node identifier of each link. When a plurality of links share the same next node, their pieces of link information are stored successively. To indicate that the next nodes are the same, a positive or negative sign is attached to the node numbers showing the previous nodes. Link numbers are uniquely assigned to respective links. A node identifier is made to correspond with a link identifier, which is realized either by assigning as the value of the node identifier the link number of a link connecting the node to the next node, or the maximum or minimum value of the link numbers of links connecting the node to the next nodes, or by attaching a unique node number to a node as with attaching a unique link number to a link.

9 Claims, 18 Drawing Sheets

FIG. 1(a) (PRIOR ART) EXAMPLE OF NETWORK STRUCTURE

N: NODE
L: LINK

FIG. 1(b) (PRIOR ART) CONVENTIONAL MEMORY FORMAT

NODE NUMBERS  1 2 3 4 5

$$\text{CONNECTION INFORMATION} \begin{bmatrix} 0 & 1 & 1 & 2 & 4 \\ 0 & 0 & 0 & 3 & 0 \\ 0 & 0 & 0 & 0 & 0 \end{bmatrix}$$

FIG. 1(c) (PRIOR ART) NODE INFORMATION

| NODE NUMBERS | 1 | 2 | 3 | 4 | 5 |
|---|---|---|---|---|---|
| NODE INFORMATION | A | B | C | D | E |

FIG. 1(d) (PRIOR ART) CONNECTION INFORMATION

| NODE NUMBERS | 1 (A) | | | 2 (B) | | | 3 (C) | | | 5 (E) | | |
|---|---|---|---|---|---|---|---|---|---|---|---|---|
| CONNECTION INFORMATION | 0 | 0 | 0 | 1 | 0 | 0 | 1 | --- | --- | 4 | 0 | 0 |

FIG.2(a) 210: DATA PROCESSOR (CPU/MEMORY)

NETWORK

FIG.2(b) LINK INFORMATION

| LINK NUMBERS | 1 | 2 | 3 | 4 | 5 | 6 |
|---|---|---|---|---|---|---|
| CONNECTION INFORMATION | 0 | 1 | 1 | -2 | 3 | 5 |

FIG.2(c) NODE INFORMATION

| NODE NUMBERS | 1 | 2 | 3 | 4 | 5 | 6 |
|---|---|---|---|---|---|---|
| NODE INFORMATION | A | B | C | - | D | E |

EXAMPLE OF
NETWORK STRUCTURE

EXAMPLE OF DATA STRUCTURE

LINK NUMBERS   1 2 3 4 5 6 7 8 9 10

CONNECTION
INFORMATION   [ 0 1 1 -2 3 -5 8 5 -7 8 ]

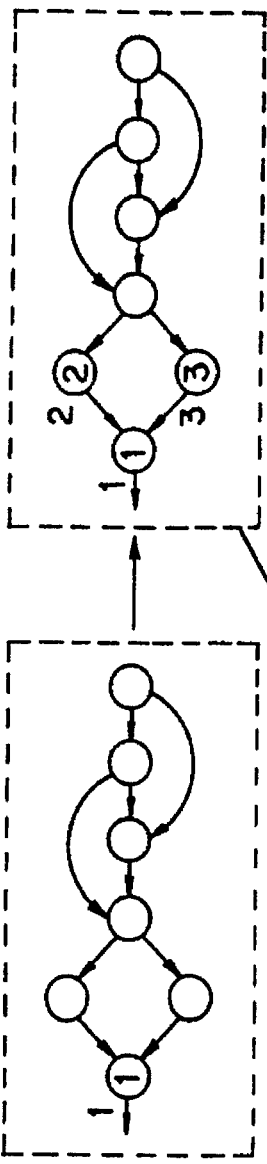
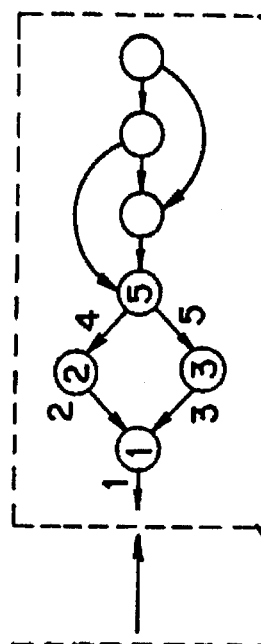
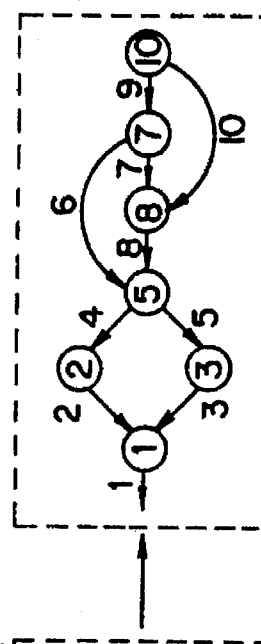
FIG.5(a) FIG.5(b) FIG.5(c) FIG.5(d) FIG.5(e) FIG.5(f)

FIG.9(a) VOICE RECOGNITION SYSTEM
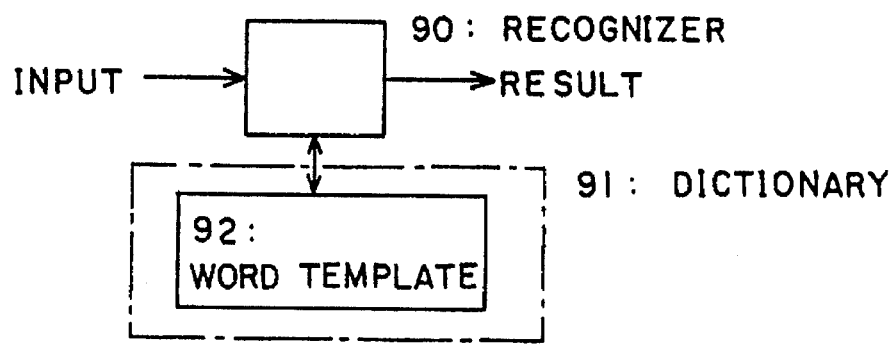
FIG.9(b) WORD TEMPLATE
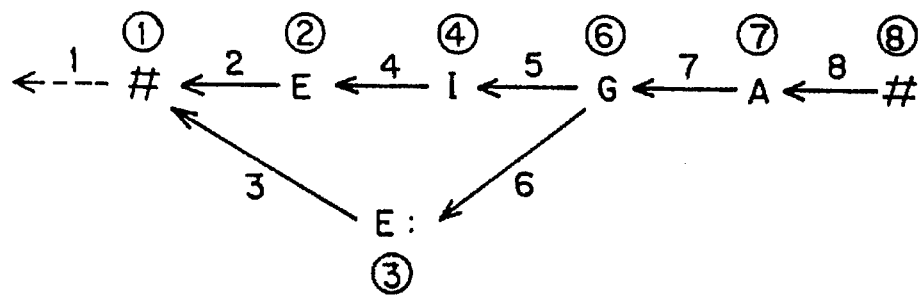
FIG.9(c) LINK INFORMATION
LINK NUMBERS      1 2 3 4  5 6 7 8
CONNECTION INFORMATION  [ 0 1 1 2 -4 3 6 7 ]
FIG.9(d) NODE INFORMATION
NODE NUMBERS     1 2 3 4 5 6 7 8
NODE INFORMATION [ # E E I - G A # ]

FIG.10(a) NETWORK EXAMPLE
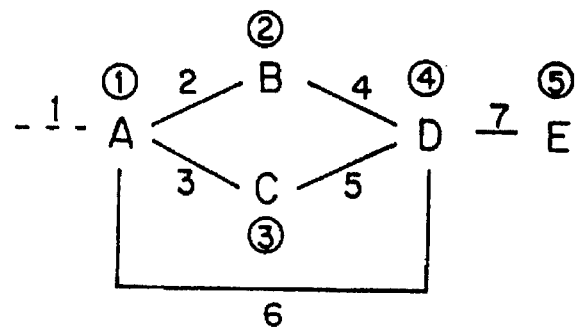
FIG.10(b) LINK INFORMATION
LINK NUMBERS     1  2  3   4   5  6  7
CONNECTION
INFORMATION    [ 0  1  1  -2  -3  1  4 ]
FIG.10(c) NODE INFORMATION
NODE NUMBERS    ①  ②  ③  ④  ⑤
NODE INFORMATION  [ A  B  C  D  E ]

FIG.11(a) COUNTER-BASED METHOD

SEARCHED LINK NUMBER    1   2   3   4   5   6   7

COUNTER VALUE    [ 1   2   3   –   –   4   5 ]

↓

NODE NUMBER

FIG.11(b) POINTER-BASED METHOD

NODE NUMBERS    ①   ②   ③   ④   ⑤

PREVIOUS LINK NUMBER    [ 1   2   3   4   7 ]

C = 1
  C = 3
  C = 4
  C = 5

P = 1

P = 3

P = 4

P = 5

NETWORK STRUCTURE STORING AND RETRIEVAL METHOD FOR A DATA PROCESSOR

This application is a continuation of application Ser. No. 07/813,744, filed Dec. 30, 1991, now abandoned.

BACKGROUND OF THE INVENTION

1. Field of the Invention

This invention pertains to a network storing method for a data processor having a function of efficiently storing, with a small memory capacity, data in a network structure such as an acoustic segment network, e.g., for use in a voice recognizer.

2. Description of the Related Art

Recently, an art of utilizing an acoustic segment network expressing a character string comprising words, e.g., in a pronunciation string has been developed for voice recognition and voice synthesis. Because such a data processor using a network has to store a very large number of networks, an efficient method for storing data in such a network using as little memory capacity as possible is sought after. In addition, a network storing method requiring the least number of accesses is also sought after, such that stored network data can be utilized as efficiently as possible.

FIGS. 1(a)–1(d) are explanatory charts of a conventional network data storing method.

In FIG. 1(a), an "N" indicates a node being a basic unit of data, and an "L" indicates a link specifying a connection between nodes.

A computer-based data, processor often uses data e.g., having a network structure shown in FIG. 1(a). Data in a network structure comprises node information about a node representing a basic unit of data and connection information regarding links between nodes and specifying their relationships.

Conventionally, data having a network structure such as the one shown in FIG. 1(a) are controlled in a memory format as shown in FIG. 1(b). That is, connection information is provided in correspondence with the node connection of each node "N". For instance, the fourth node "N", i.e., nodes "D", which is expressed by a "four [4] encircled", is connected to the second and third nodes "N" i.e., nodes "B" and "C", which are expressed by a "two [2] encircled" and a "three [3] encircled". Such data are stored in a matrix form. A part of the connection information having a value "0" shown in FIG. 1(b) indicates no further connection is available.

More specifically, as shown FIG. 1(c), node information specifying the content of node "N" is controlled for each node number N in a circle, and connection information specifying the previous node connection is provided for each node "N" corresponding to a particular node number N shown in FIG. 1(d).

A conventional method of storing a network structure controls information regarding to which previous node each node "N" is connected in a data structure having a matrix format shown in FIG. 1(b).

Such a conventional storing method for controlling each node "N" requires high memory capacity in a data storage region because a network storer must store a lot of parts in connection information having a value zero [0], which indicates no connection. This occurs because the number of connections of each node "N" is indefinite.

Also used is a method of storing the number of connections each node "N" has. However, such a method has a problem of wasting the regions for storing the number of connections each node "N" has.

SUMMARY OF THE INVENTION

This invention is made based on the above background. It aims at efficiently utilizing a reduced memory capacity by eliminating wasteful parts in the connection information upon storing a network structure in a computer-based network storer.

This invention is premised on a data processor, comprising a CPU, a memory, etc., for controlling data having network structure linking nodes in correspondence with the relations among nodes, which are basic units of data.

First, the data processor comprises a link information storer for storing as node connection information a previous or next node identifier of each link connecting a node with another node. The link information storer successively stores the link information on a plurality of links whose next nodes are the same node.

Second, the data processor comprises a node information storer for storing node information corresponding to each link. The node information storer stores the label of each link identifier assigned as a reverse directional node identifier. When the next nodes of a plurality of links are the same node, the node information storer chooses one [1] of the link identifiers and assigns it as a node identifier.

Although a link does not point to a particular direction by itself, this invention with the above configuration conveniently identifies a temporary direction for distinguishing a previous link from a next link. This is realized by assigning a unique link number L to each link and by using, as the value of the node identifier, the same value as the link number L of a link connecting the node to the next node or the maximum or minimum value of the link numbers L of links connecting the node to the next nodes. An attachment of a positive or negative sign to a node number N indicating a reverse directional node and a selection by the positive or negative sign enables one [1] of the successively stored links to be selected.

An automatic assignment of a link identifier to each link connecting respective nodes and of a node identifier to each node also enables a previous link to be distinguished from a next link. In this case, the link information storer stores, as the connection information of a node, the previous or next node identifier of each node. When the reverse directional nodes of a plurality of links are the same, their link information is stored successively. In selecting one [1] of the links stored successively, a positive or negative sign is attached to a node number N indicating a reverse directional node and a selection of a link is made by the sign. Meanwhile, the node information storer sequentially stores the label information of each node.

The above described configuration of this invention enables computer to require a less memory capacity for storing data, by specifying links in a network structure.

Also, because the use of the network storing method pursuant to this invention for use by the network in a data processor requires a reduced number of accesses to a network memory part for restoring a network, the processing efficiency is improved.

BRIEF DESCRIPTION OF THE DRAWINGS

Those in the same field can easily understand additional objects and features of this invention from some of the attached drawings and the description of the preferred embodiments of this invention.

Following are brief descriptions of the drawings:

FIGS. 5(a)-5(f) illustrate the creation of a data structure for use in the preferred embodiment of this invention shown in FIGS. 3 and 4;

FIGS. 9(a)-9(d) explain an application of this invention to a voice recognition system;

FIGS. 10(a)-10(c) illustrate an exemplary data structure of a second preferred embodiment;

FIGS. 11(a) and 11(b) illustrate a network restoration in the second preferred embodiment;

DETAILED DESCRIPTION OF THE INVENTION

Explanation of an Underlying Principle

Figure 1:
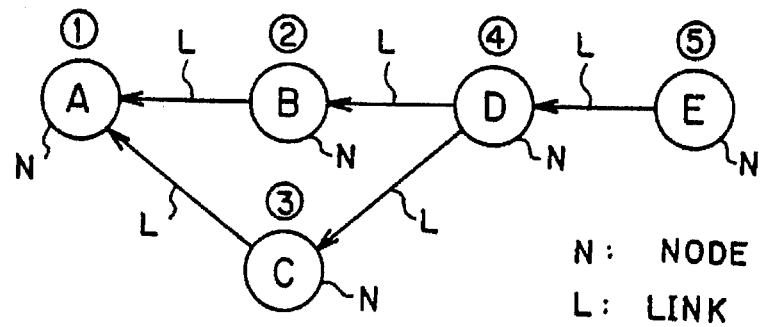
FIGS. 1(a)-1(d) are explanatory charts of a conventional network data storing method.
Figure 2:
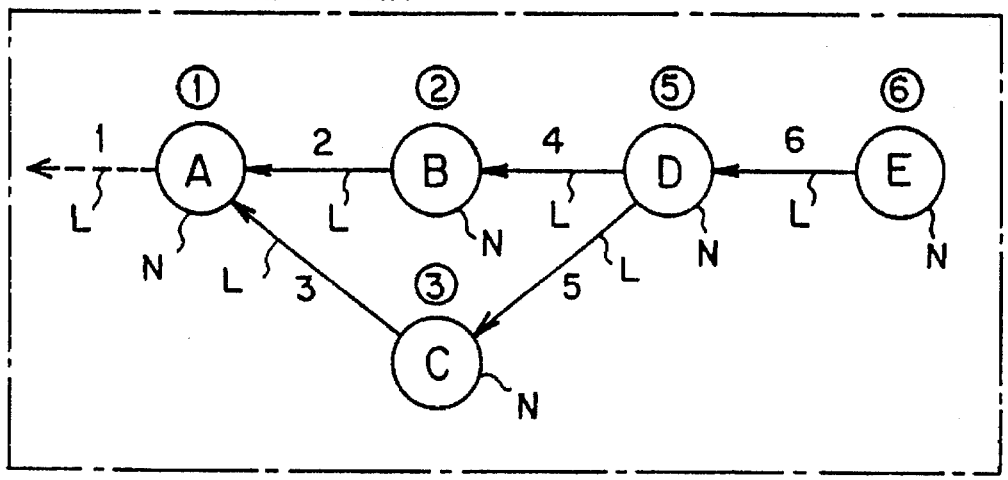
FIGS. 2(a)-2(c) are block diagram of this invention.

FIG. 2(a) is a block diagram of this invention.

In FIG. 2(a), 210 is a data processor comprising a CPU, a memory and so forth; an "N" is a node expressing a basic unit of data; and an "L" is a link connecting node. A number attached to a link "L" indicates a link number, which is a link identifier; and an encircled number attached to a node "N" indicates a node number N, which is a node identifier.

The principle of this invention is explained by taking an example of applying this invention to storing data having a network structure such as the one shown in FIG. 2(a). This invention causes the next node number N of a link "L" to be stored as connection information of a particular link "L" instead of having a node "N" carry link information with it. The link number L of a link "L" having the next node "N" is assigned to the node number N.

That is, as shown in FIG. 2(b), the next node number N of each link number L is stored. A link "L" having a link number "1" is a dummy link for determining the node number N of node "A". This enables the node number N of node "A" to be set "1". Links "L" having link numbers "2" and "3" store "1" as their connection information, because their respective previous node numbers N are both "1". Similarly, the node numbers N of nodes "B" and "C" are "2" and "3", which are the link numbers L further back.

Because links "L" having link numbers "4" and "5" have a common node "N", i.e., node "D" having a node number N five [5] encircled, further back, the pieces of information on these two [2] links "L" are stored successively. Either link number "4" or "5" needs to be assigned to the node number N of "D", which is a next node. A positive or negative sign is used here to distinguish the pieces of connection information.

An example shown in FIG. 2(b) causes connection information having a positive link number L to store the node number N in the next link. Thus, the node number N of node "D" is "5".

As shown in FIG. 2(c), each node information is stored as a concrete content of node "N" in correspondence with the respective node numbers N. A pointer whose pointer value P corresponds to each node number N points to a region for storing node information. Because a node "N" having a node number "4" does not exist, the node information is "void". As information of node number "4", the content of node "D" can be stored in duplication.

Although an example shown in FIG. 2(b) causes a previous link number L of a link "L" to be stored as its connection information, it goes without saying that a storage of the next node number N enables this invention to be realized in a similar manner.

An application of the network storing method pursuant to this invention to a storage of a word template such as an acoustic segment, e.g., in a voice recognition system enables its needed memory capacity to be reduced significantly.

An operation of this invention configured as above is explained next.

When a computer, such as a data processor, stores a network structure, respective links are specified. Their previous or next node identifiers are stored as connection information. A node identifier in the reverse direction has an implicit correspondence with a link identifier due to an assignment of the link identifier. One [1] of the link identifiers of the successively stored links having the same node in the reverse direction is assigned to the node identifier in the reverse direction.

This enables data in a network structure to be controlled by storing information on node identifiers for the number of links, thereby eliminating the necessity of storing redundant connection information.

When a non-directional link configures a network, the direction of such a link is distinguished by attaching a temporary direction. Then, the connection information for each link is stored in a manner similar to the above explanation.

As shown in FIG. 2(a)-2(c) a link number L uniquely attached to each link "L" is used as a link identifier, and the node number N having the same value as the value of the link number L of a link "L" connecting the node "N" to the next node "N", or as the maximum or minimum value of the link numbers L of links "L" connecting the node "N" to the next nodes "N", is used as a node identifier. This eliminates a need for having to control node numbers N separately from link numbers L.

For selecting one [1] of the links "L" successively stored, a positive or negative sign is attached to a node number N indicating a node "N" in the reverse direction, thereby enabling such a selection. This enables a link "L" corresponding to a node "N" to be easily determined, when there are a plurality of links "L" previous to or next to a particular node "N". That is, it becomes possible to easily determine the link number L used as a node number N from among the link number group.

It is also possible to store a network structure by separately controlling link identifiers and node identifiers.

In such a case, a number is assigned as a link identifier to each link, and a node number N is assigned as a node identifier Go each node. The node number N of a previous or next node for each link is stored as connection information. When a link has a plurality of nodes in the reverse direction, the pieces of connection information on the links are stored successively. To discriminate links "L" stored successively, a positive or negative sign is attached to a node number N indicating a node "N" in the reverse direction, thereby making a distinction.

Explanation of Preferred Embodiments

Preferred embodiments of this invention are explained in further detail by referring to some other drawings.

Figures 3, 4:
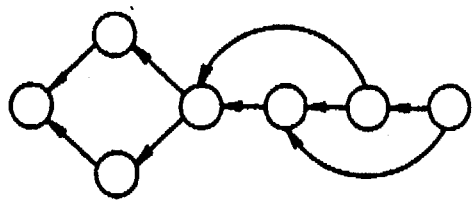
FIG. 3 illustrates an example of a network structure.
FIG. 4 illustrates an exemplary data structure for use in a preferred embodiment of this invention shown in FIG. 3.
Figure 6A:
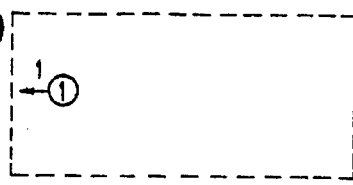
FIGS. 6(a)-6(l) explain the restoration of a network structure in a preferred embodiment.
Figure 6B:
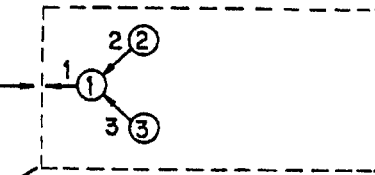
Figure 6C:
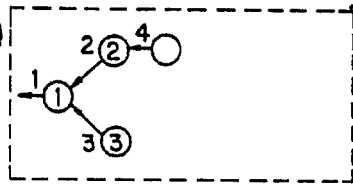
Figure 6D:
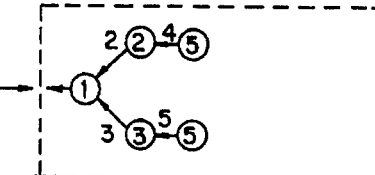
Figure 6E:
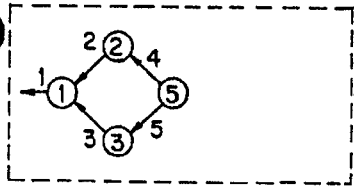
Figure 6F:
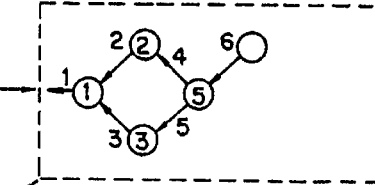
Figure 6G:
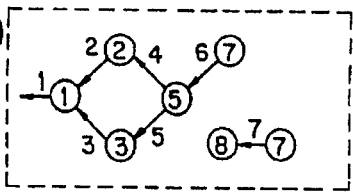
Figure 6H:
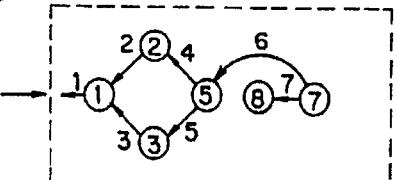
Figure 6I:
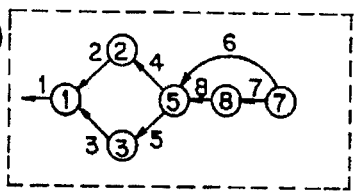
Figure 6J:
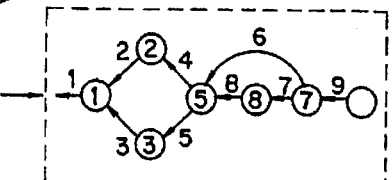
Figure 6K:
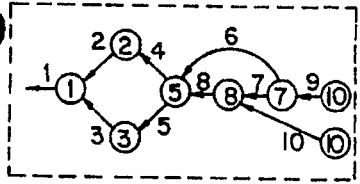
Figure 6L:
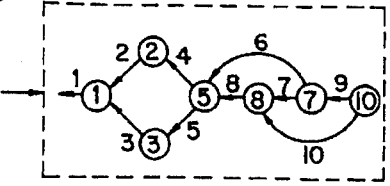

FIG. 3 illustrates an example of a network structure.

FIG. 4 illustrates an exemplary data structure for use in a preferred embodiment of this invention shown in FIG. 3.

FIGS. 5(a)–5(f) illustrate the creation of a data structure for use in the preferred embodiment of this invention shown in FIGS. 3 and 4.

When a computer internally stores a network structure such as that shown in FIG. 3, this invention causes pieces of connection information (on node numbers N) to be stored in correspondence with respective link numbers L, as shown in FIG. 4.

FIGS. 5(a)–5(f) show a manner of creating the data structure shown in FIG. 4 from the network structure shown in FIG. 3.

5(a) First, a dummy link (whose link number L is one [1]) is connected to the head end node. The connection information of the link number one [1] has a value zero [0].

5(b) Next, node number one [1] is assigned to the next node of a link whose link number L is one [1]. Link numbers "2" and "3" are assigned to two [2] links in the next node. Thus, both pieces of the connection information of link numbers "2" and "3" have a value one [1].

5(c) Then, "2" and "3" are assigned as the node numbers N of the next nodes of the links having the link numbers "2" and "3". Link numbers "4" and "5" are assigned to the links further back.

5(d) Because links having the link numbers "4" and "5" have the same next node, the value five [5], which is the larger of the two [2], is selected as a node number N. The connection information on the link having link number "4" is made to have a negative value and that of the link having link number "5" is made to have a positive value.

5(e) Similarly, links having link numbers "6" and "7" determine the node having node number "7".

5(f) Also, links having link numbers "8" and "10" determine the nodes having node numbers "8" and "10", thereby finally creating the data structure as shown in FIG. 4.

FIGS. 6(a)–6(l) explain the restoration of a network structure in a preferred embodiment.

That is, converse to the case shown in FIGS. 5(a)–5(f), FIGS. 6(a)–6(f) show a case of restoring a network structure shown in FIG. 3.

6(a) Because the connection information of a link having a link number "1" has a value zero [0], a dummy link and a node having a node number "1" are restored.

6(b) Because the values of connection information of links having link numbers "2" and "3" are both one [1], link numbers "2" and "3" are connected to the node having a node number "1" and next nodes having node numbers "2" and "3" are restored.

6(c) The link having a link number "4" is connected to the node having a node number "2". Because the value of connection information of the link having a link number L is negative, the node number N is kept pending.

6(d) The link having a link number "5" is connected to the node having a node number "3". The node having a number "5" is set to the next node of the links having link numbers "4" and "5".

6(e) The nodes having a node number "5" are integrated.

6(f) A link having a link number "6" is extended behind the node having a node number "5". The node numbers N of the next nodes are kept pending.

6(g) The node having a node number "8" is restored from the connection information of the link having a link number "7".

6(h) The nodes having a node number "7" are integrated.

6(i) Per the connection information of the link having a link number "8", the link having a link number "8" is pointed to the node having a node number "5".

6(j) The link having a link number "9" is extended to the previous node having a node number "7". The node numbers N of the next nodes are kept pending.

6(k) The node having a node number "10" is restored from the connection information of the link having a link number "10". The link having a link number "10" is extended to the node having a node number "8".

6(l) The next nodes of the links having link numbers "9" and "10" having a node number "10" are integrated.

Figure 7:
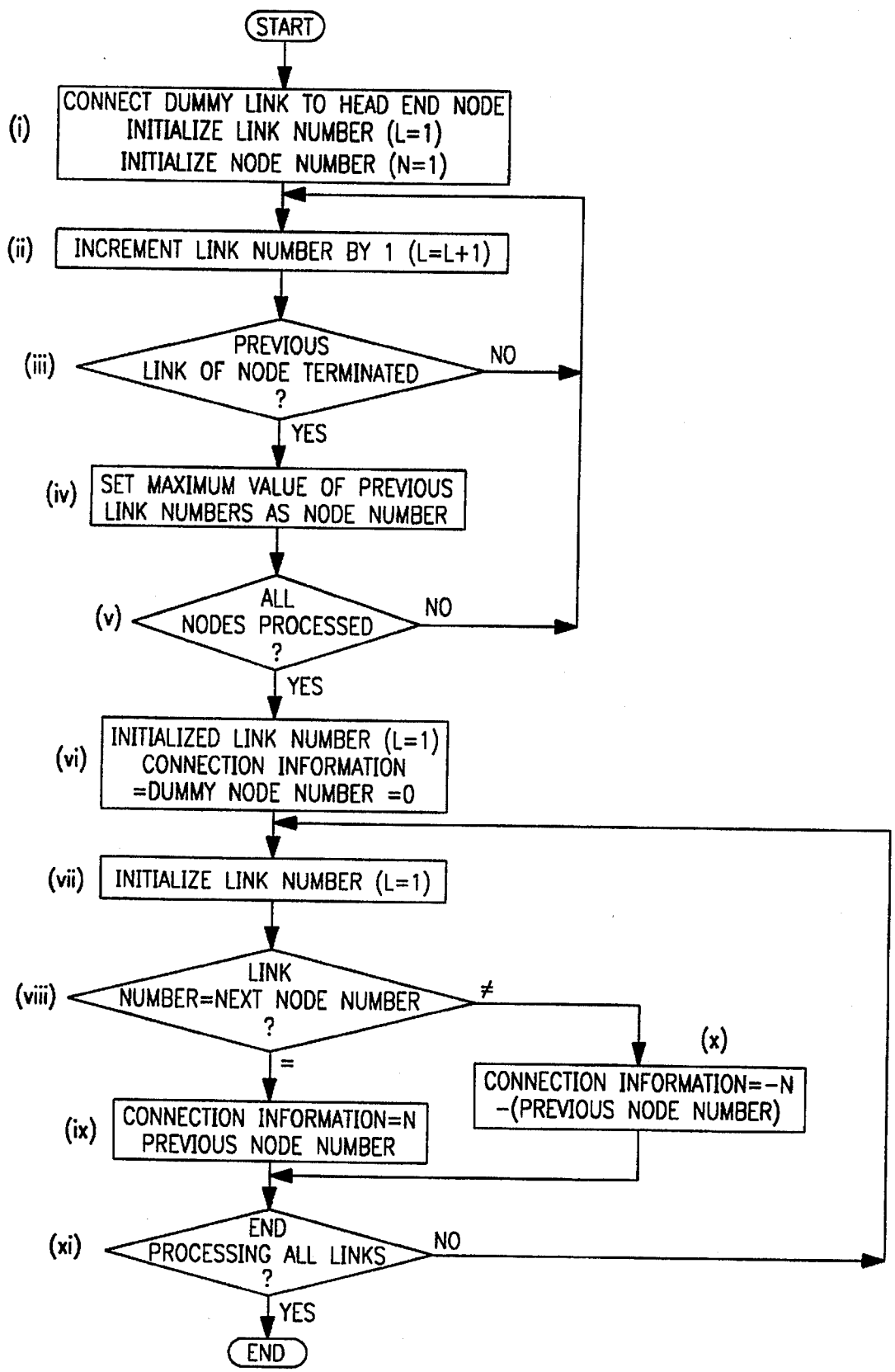
FIG. 7 is a flowchart of the creation of a data structure for use in a preferred embodiment of this invention.

FIG. 7 is a flowchart of the creation of a data structure for use in a preferred embodiment of this invention.

An algorithm for creating a data structure shown in FIGS. 5(a)–5(f) is as follows:

(i) Connect a dummy link to the head end node. Set L=1 as a link number L and N=1 as a node number N.

(ii) Increment the link number L by one [1] and assign the new link number L to the link. (L=L+1)

(iii) Judge whether or not the link in front of a currently specified node is terminated. If it is not terminated, revert to process (ii) and assign the next link number L.

(iv) If the assignment of a link number L is complete, set the maximum value of the previous link numbers L as the node number N.

(v) Judge whether or not the processes for all nodes are finished. If they are not complete, revert to process (ii) and repeat the processes in a loop form.

(vi) When processes for all nodes are complete, initialize the link number L to "L=1" and set the node to have a dummy node number zero [0] as its connection information.

(vii) Increment the link number L by one [1] and assign the new link number L to the link. (L=L+1)

(viii) Judge whether or not the link number L of a currently specified link matches the node number N of a next node. If they match, execute process (ix), otherwise skip to process (x).

(ix) Set the previous node number N as connection information.

(x) Set the negative previous node number −N as connection information.

(xi) Judge whether or not processes for all links are complete. If they are complete, end creating a data structure, otherwise revert to process (vii) and repeat the processes in a loop form.

Figure 8:
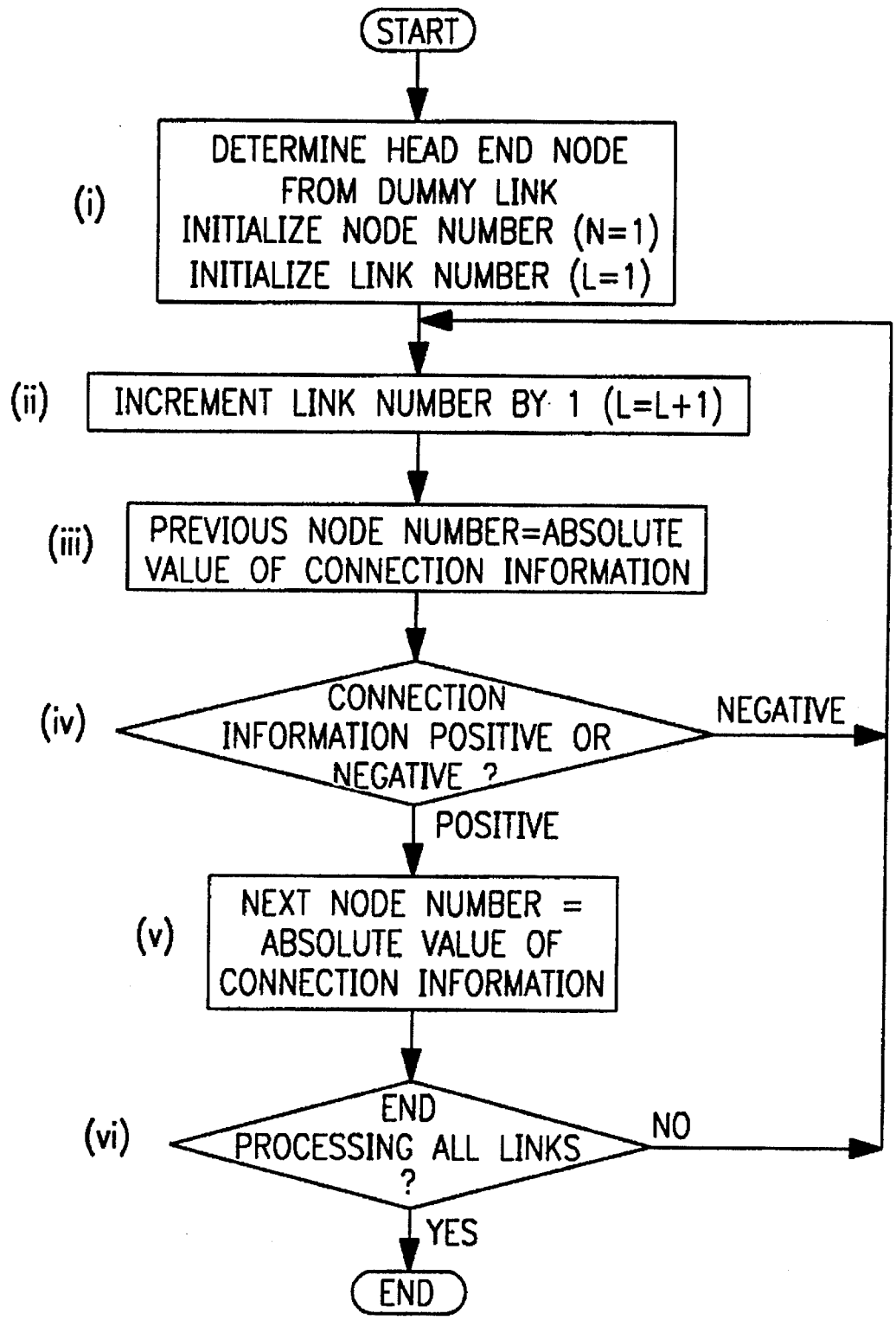
FIG. 8 is a flowchart of the restoration of a network structure for use in a preferred embodiment of this invention.

FIG. 8 is a flowchart of the restoration of a network structure for use in a preferred embodiment of this invention.

An algorithm for restoring a network structure such as that shown in FIG. 3 from a data structure shown in FIG. 4 is as follows:

(i) Determine the head end node from a dummy link. Set L=1 as a link number L and N=1 as a node number N.

(ii) Increment the link number L by one [1] and assign the new link number L to the link. (L=L+1)

(iii) Assign a number obtained from the absolute value of the connection information to the node number N in front of a currently specified link.

(iv) Judge the sign of the connection information. If it is negative, revert to process (ii) for its execution for the next link. If it is positive, proceed to step (v).

(v) Set the next node number N as the absolute value of the current connection information.

(vi) Judge whether or not the processes for all links are finished. If they are not complete, revert to process (ii) and repeat the processes in a loop form. If they are complete, end restoring the network structure.

FIGS. 9(a)–9(d) explain an application of this invention to a voice recognition system.

In part FIG. 9(a), 90 is a recognizer for analyzing an input voice and outputting a recognition result, 91 is a dictionary for storing a standard feature pattern extracted from a voice, and 92 is a word template being a standard feature pattern for each word to be recognized.

For example, a voice recognition system such as that shown in FIG. 9(a) expresses a word template 92 in a dictionary 91 in a network structure shown in FIG. 9(b).

The word template 92 shown in FIG. 9(b) illustrates that a Japanese word "eiga" (meaning "motion picture" is pronounced as either "E-I-G-A" or "E: -G-A". A "#" sign indicates a beginning or an end. Respective nodes such as "E" and "E:" express sound elements which are the basic units representing voice features.

This invention causes a network structure shown in FIG. 9(b) to be expressed in link information shown as FIG. 9(c) and to be stored in the dictionary 91. Information on respective nodes is stored as shown in FIG. 9(d). In FIG. 9(d), the node number "5" has an empty column, which indicates that no node having a node number "5" exists.

So far, an application of this invention to the dictionary 91 in a voice recognition system has been described. This invention is also applicable to other systems handling data having a network structure in a similar manner.

Also, a network restoration using the network storing method pursuant to the above embodiment of this invention allows a storage device to be accessed by the number of all links "L", which is less than "L+N" (where L is the number of all links and N is the number of all nodes) pursuant to a conventional method. Therefore, the processing efficiency is improved.

FIGS. 10(a)–10(c) illustrate an exemplary data structure of a second preferred embodiment.

FIG. 10(a) shows an example of a network. FIGS. 10(b) and 10(c) respectively show the link information and the node information of the network shown in FIG. 10(a).

The second preferred embodiment is such that numbers are automatically assigned to respective links and respective nodes. In FIG. 10(a), numbers one [1] through seven [7] are assigned to respective links, and numbers one [1] encircled through five [5] encircled are assigned to respective nodes.

The previous node number N of each link number L is stored as link information. At this time, zero [0] is assigned to the node number N of a head end link, and pieces of link information of the links having the same next node are stored successively. That is, because the previous nodes of the two [2] links having link numbers "2" and "3" both have node number "1", "1" is stored as their respective pieces of connection information. Because the links having link numbers "4", "5" and "6" have the same next node, they are stored successively. To indicate that they are stored successively, a negative sign is attached to previous node number "2", which is the connection information of the link having link number "4", and to previous node number "3", which is the connection information of the link having link number "5". No negative sign is attached to previous node number "1", which is the connection information of the link having link number "6". A positive number kept "as is" shows the end of successively stored pieces of connection information. Further more, previous node number "4" is stored as connection information for the link having link number "7".

Node information, on the other hand, is much simpler as shown in FIG. 10(c). Labels corresponding to respective node numbers N or pointer values P pointing to labels are stored as pieces of node information.

The second embodiment requires approximately the same memory capacity as the first embodiment and is effective in reducing the needed memory capacity from what the prior art has required.

FIGS. 11(a) and 11(b) illustrate a network restoration in the second preferred embodiment.

More specifically, FIGS. 11(a) and 11(b) illustrate a case in which a network shown in FIG. 10(1) is restored from the network information shown in FIGS. 10(b) and 10(c).

When a network is restored from the connection information shown in FIG. 10(b), it is possible to restore up to node "A". However, the relations with the previous nodes are not known, although it is known that the previous node of the link having link number "7" is node "D", which is the node having node number "4". Thus, two [2] methods are considered below for determining the node relations. A first method is to search the connection information sequentially from the head end with a counter. More concretely, the counter counts the number of non-negative node numbers N in the connection information.

FIG. 11(a) shows a case in which a network shown in FIG. 10(a) is restored from network information shown in FIG. 10(b) by using a counter pursuant to the first method.

First, the counter has a value one [1] at the link having link number "1", whose next node number N is one [1].

Similarly, the counter has a value two [2] at the link having link number "2", whose next node number N is two [2]. Also, the counter has a value three [3] at the link having link number "3", whose next node number N is three [3]. Because the link having link "4" has a negative next node number N, the counter is not incremented. The next link, i.e. the link having link number "5", is examined without determining the next node number N of the link having link number "4". Because the link having link number "5" also has a negative node number N, the counter is not incremented either. The next link, i.e., the link having link number "6", is examined without determining the next node number N of the link having link number "5". Then, the counter has a value four [4] at the link having link number "6", whose next node number N is "3". Here, it is known that the links having link numbers "4", "5" and "6" all have the same next node number N, which is "4".

As described above, searching for connection information by incrementing a counter enables a network to be restored.

A second method is to have the previous link information of each node as a pointer during a data creation.

FIG. 11(b) shows a case in which a network shown in FIG. 10(a) is restored from network information shown in FIG. 10(b) by using a pointer pursuant to the second method.

Nodes respectively hold their previous link numbers L as their pointers. This shows that the node having node number "1" has the previous link having link number "1", that the node having node number "2" has the previous link having link number "2", that the node having node number "3" has the previous link having link number "3", that the node having node number "4" has the previous link having link number "4", and that the node having node number "5" has the previous link having link number "7". Because it is known that the node having node number "4" has the previous link having link number "4", a combination with the link information shown in FIG. 10(b) reveals that the node having node number "4", i.e., node "D", has the previous links having link numbers "4", "5" and "6".

Because the second method requires that the previous link pointers of respective nodes be created beforehand, it requires a memory capacity larger than what the first method requires.

Figure 12:
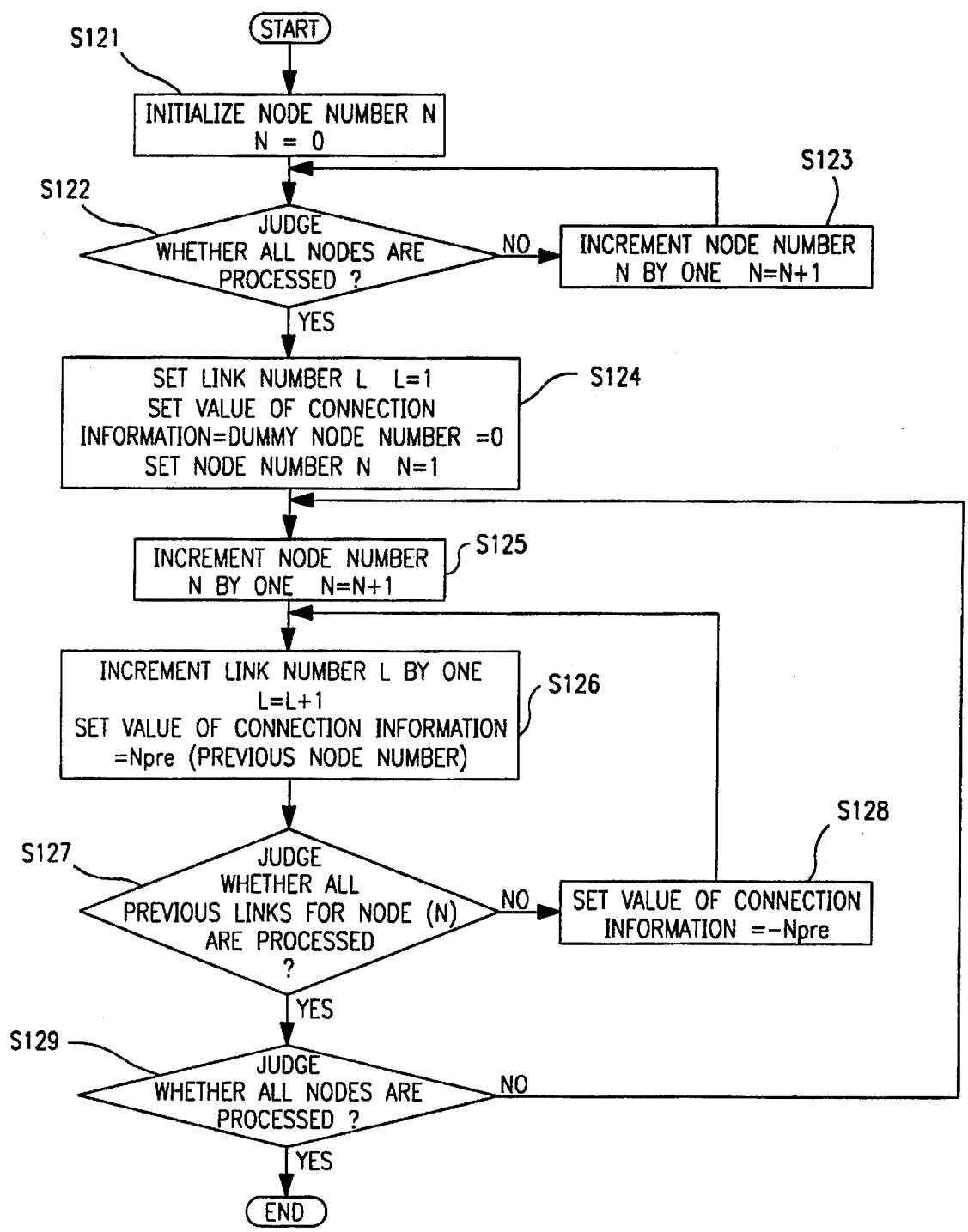
FIG. 12 shows an algorithm for forming a data structure based on a network structure according to a counter-based method.

FIG. 12 shows an algorithm for creating a data structure from a network structure by the counter-based method.

START: Upon start of creating a data structure from a network structure, step S121 is invoked.

Step S121: Initialize a node number N to zero. (N=0) Then, proceed to step S122.

Step S122: Judge whether or not all nodes are processed. If the judgment is affirmative (YES), skip to step S124. If the judgment is negative (NO), proceed to step S123.

Step S123: Increment the node number N by one [1]. (N=N+1) Then, revert to step S122.

Step S124: Set a link number L to one [1]. (L=1) Set a value of connection information equal to dummy node number, which is zero [0]. Set the node number N to one [1]. (N=1) Then, proceed to step S125.

Step S125: Increment the node number N by one [1]. (N=N+1) Then, proceed to step S126.

Step S126: Increment the link number L by one [1]. (L=L+1) Set the value of connection information equal to Npre, the previous node number. Then, proceed to step S127.

Step S127: Judge whether or not all previous links for node (N) are processed. If the judgment is negative (NO), proceed to step S128. If the judgment is affirmative (YES), skip to step S129.

Step S128: Set the value of connection information equal to —Npre. Then, revert to step S126.

Step S129: Judge whether or not all nodes are processed. If the judgment is negative (NO), revert to step S125. If the judgment is affirmative (YES), end the process. [END]

FIG. 13(a)–13(f) show steps of creating a data structure from a network structure by the counter-based method.

Part (a): Labels A, B, C, D and E are attached to respective nodes in a network structure.

Part (b): Node numbers N are assigned to all nodes in the network structure.

Part (c): Link information establishes the correspondences between link numbers L, which are one [1], two [2] and three [3], and values of connection information, (i.e., previous node numbers,) which are zero [0], one [1], one [1]; and node information establishes the correspondences between the node numbers N and the labels A, B and C.

Part (d): Link information establishes the correspondences between the link numbers L, which are four [4] and five [5], and the values of connection information, which are minus two [−2] and minus three [−3]. When the value of connection information is negative, only the link number L is increased, whereas the node number N is not.

Part (e): The value of connection information for the link whose link number L is six [6] is one [1].

Part (f): Therefore, the node number N is increased to five [5], and the value of connection information, which is four [4], corresponds to the link whose link number L is seven [7]. Thus, the "link information" and the "node information" are stored e.g. in a memory.

Figure 14:
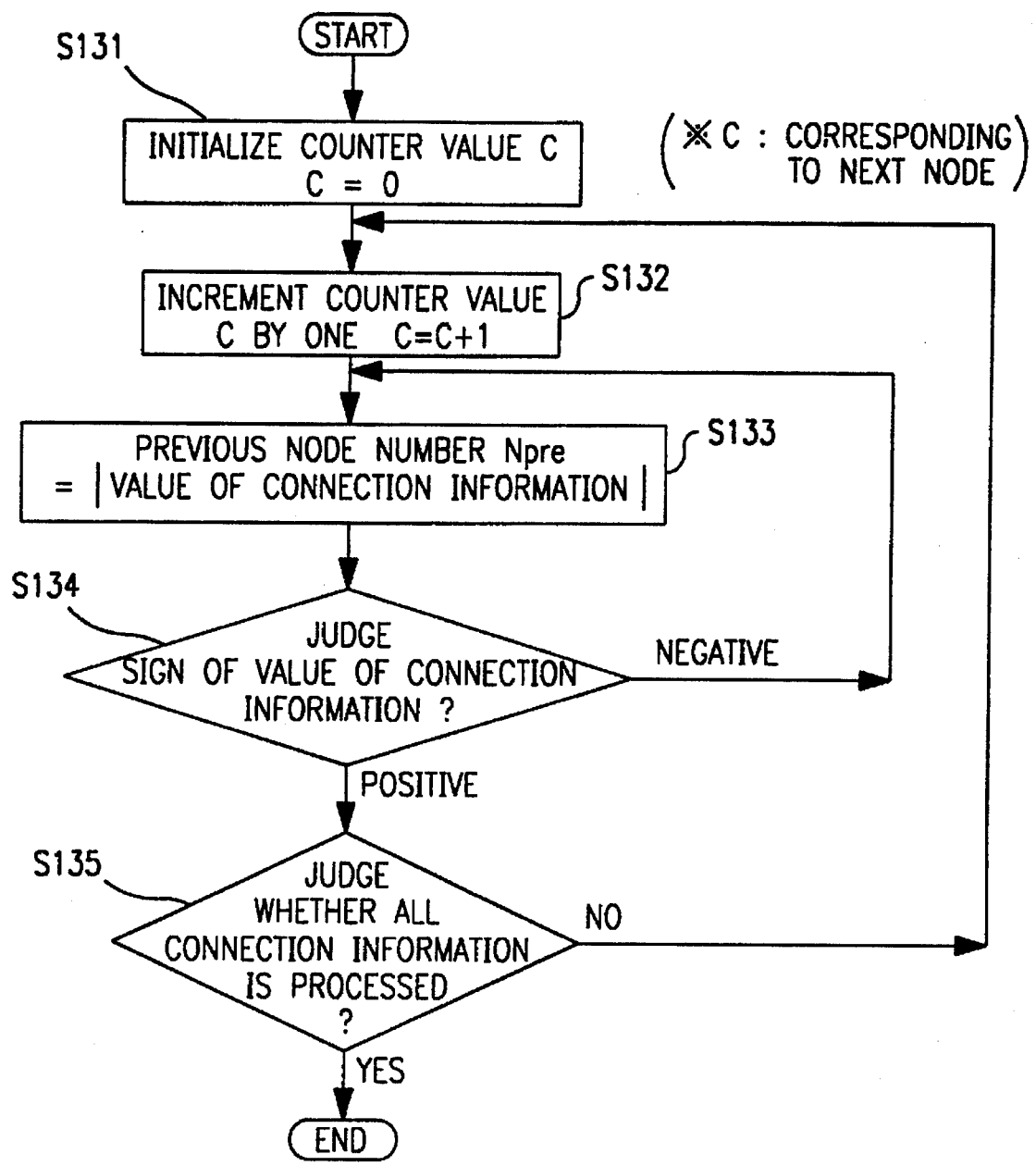
FIG. 14 shows an algorithm for restoring a network structure based on a data structure according to a counter-based method.
Figure 15A:
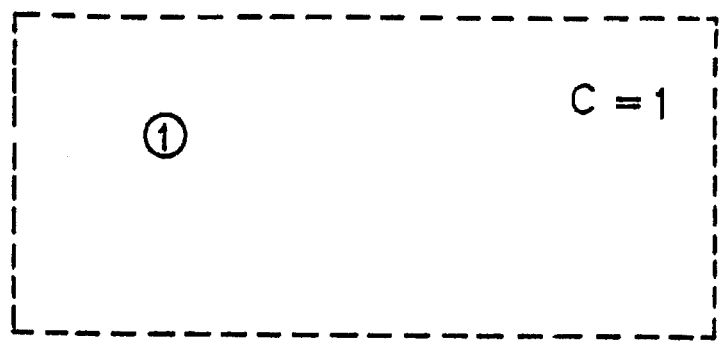
FIGS. 15(a)-15(d) show explanatory views of a process of restoring a network structure based on a data structure according to a counter-based method.
Figure 15B:
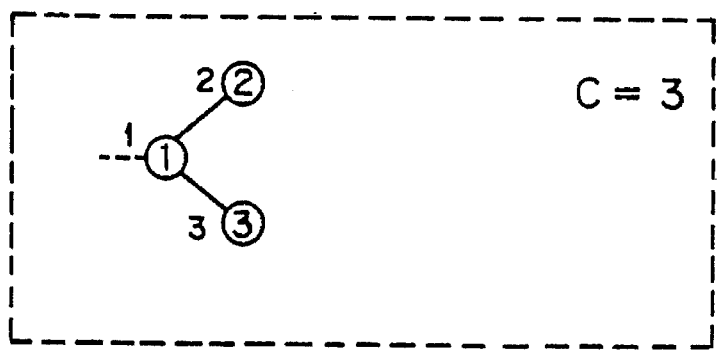
Figure 15C:
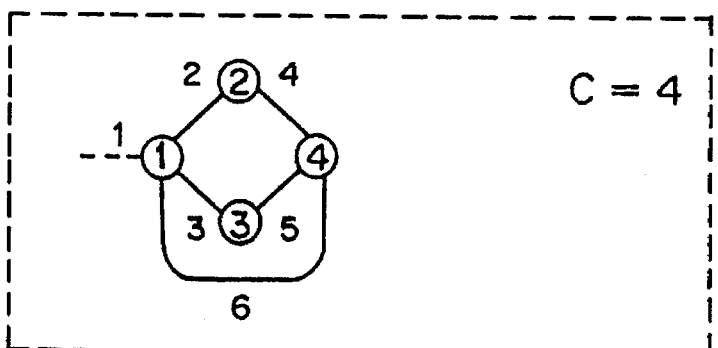
Figure 15D:
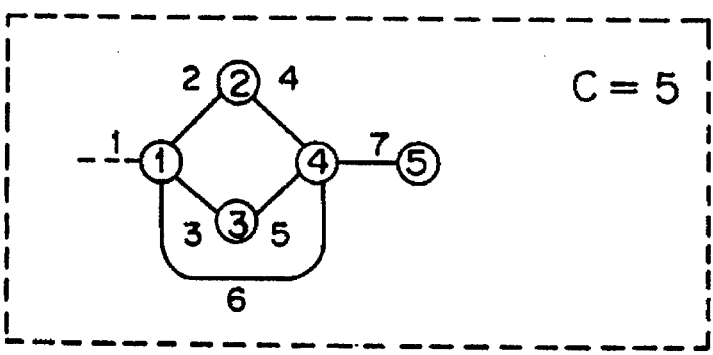

FIG. 14 shows an algorithm for restoring a network structure from a data structure by the counter-based method.

In FIG. 14, a counter value C stores the node number N of the next node.

START: Upon start of the process, step S131 is invoked.

Step S131: Initialize the counter value C to zero [0]. (C=0) Then, proceed to step S132.

Step S132: Increment the counter value C by one [1]. (C=C+1) Then, proceed to step S133.

Step S133: Because the link number L of the link previous to the node whose node number N is one [1] is also one [1], obtain the value of connection information (i.e. the node number N of the previous node), which is zero [0], corresponding to the link whose link number L is one [1] from the link information shown in part (f) of FIG. 12B. This is expressed in FIG. 14 as, Npre=|value of connection information|.

Then, proceed to step S134.

Step S134: Judge the sign of the value of the connection information. If the sign is negative, revert to step S133. If the sign is positive, proceed to step S135.

Step S135: Judge whether or not all connection information is processed. If the judgment is negative (NO), revert to step S132. If the judgment is affirmative (YES), end the process. [END]

That is, when the judgment in step S135 is negative (NO), the counter value C is incremented by one [1] in step S132, thereby increasing the node number N of the next node from one [1] to two [2].

Figure 13A:
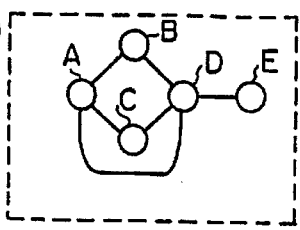
FIGS. 13(a)-13(f) show explanatory views of a process of forming a data structure based on a network structure according to a counter-based method.
Figure 13B:
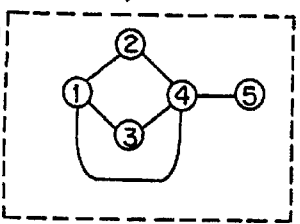
Figure 13C:
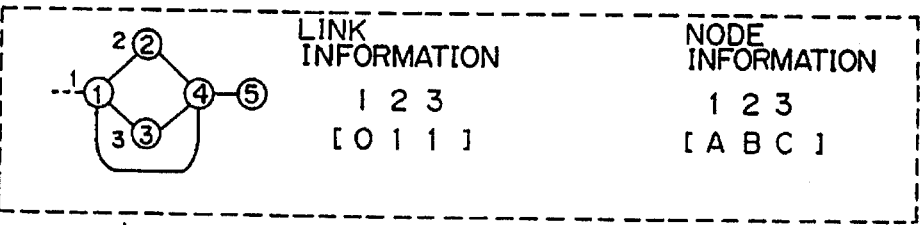
Figure 13D:
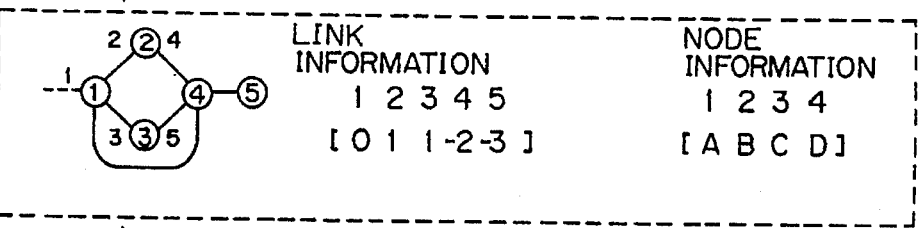
Figure 13E:
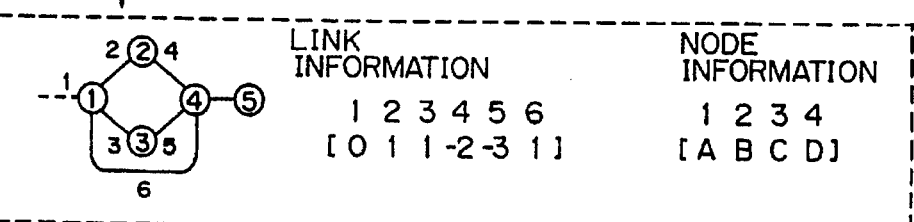

Also, when the value of connection information is negative, e.g. minus two [−2], in step S134, only the link number L is increased, whereas the node number N is not, as shown in FIG. 13(d). This indicates that a plurality of links branch out from the next node.

FIGS. 15(a)–15(d) show steps of restoring a network structure from a data structure by the counter-based method.

Because the counter value C corresponds to the node number N of the next node, the link number L of a link branching from the next node having the node number N is searched from a data structure shown in FIG. 11(a). FIG. 11(d) reveals the following information on the counter value C: C=1 when L=1, C=2 when L=2, C=3 when L=3, no information (NIL) is obtained when L=4, no information (NIL) is obtained when L=5, and C=4 when L=6. Therefore, it is only searched from the link whose link number L is six [6] that the links branching out from the next node whose node number N is four [4] are links whose link numbers are four [4], five [5], and six [6].

Figure 13F:
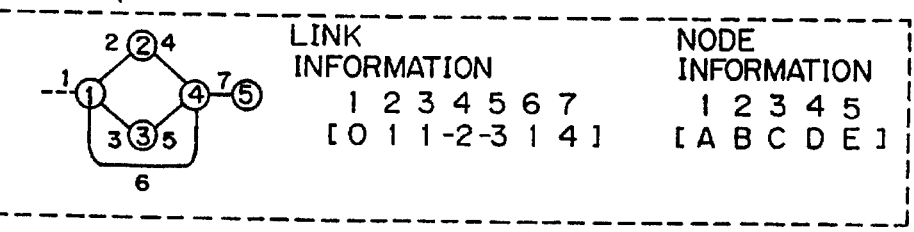

Part (a): The counter value C is incremented from zero [0] to one [1]. That is, the next node is {1}. The counter value C is one [1], i.e. C=1. Because the link number L of the link connected to node {1} is one [1], the value of connection information for the link whose link number L is one [1] is obtained. The value of connection information is zero [0], as shown in FIG. 13(f). Because at this time the node number N has the dummy node number zero [0], zero [0] is stored as the node number N. Thus, zero [0] is substituted into the node number N of the previous node.

Part (b): The counter value C is counted up to two [2], because the dummy node number zero [0] is not a negative value. Because the link number L of the link connected to the node whose node number N is two [2] is also two [2], the value of connection information is one [1]. Because the value of connection information is positive, the counter value C is counted up to three [3], i.e. C=3. Then, the link number L, which is three [3], is obtained from the node number N, which is three [3]. Then, the value of connection information is one [1]. Therefore, the counter value C must be four [4], i.e., C=4.

Part (c): The link numbers L of the links connected to the next node whose node number N is four [4] are four [4], five [5] and six [6]. Because the value of connection information of the link whose link number L is four [4] is minus two [-2] and the value of connection information of the link whose link number L is five [5] is minus three [-3], the node numbers N of the previous nodes are two [2] and three [3].

Because the value of connection information is negative, the counter value C is not counted up, and the value of connection information, which is minus three [-3], is read. This indicates that the node number N of the previous node is three [3]. When the counter value C is not counted up, the value of connection information, which is one [1], of the link whose link number L is six [6] is obtained.

Part (d): Because the value of connection information is positive, the counter value C is counted up to five [5], i.e., C=5. Thus, the previous links from the node whose node number N is five [5] are searched. The value of connection information, which is four [4], is read from the link whose link number L is seven [7].

Figure 16:
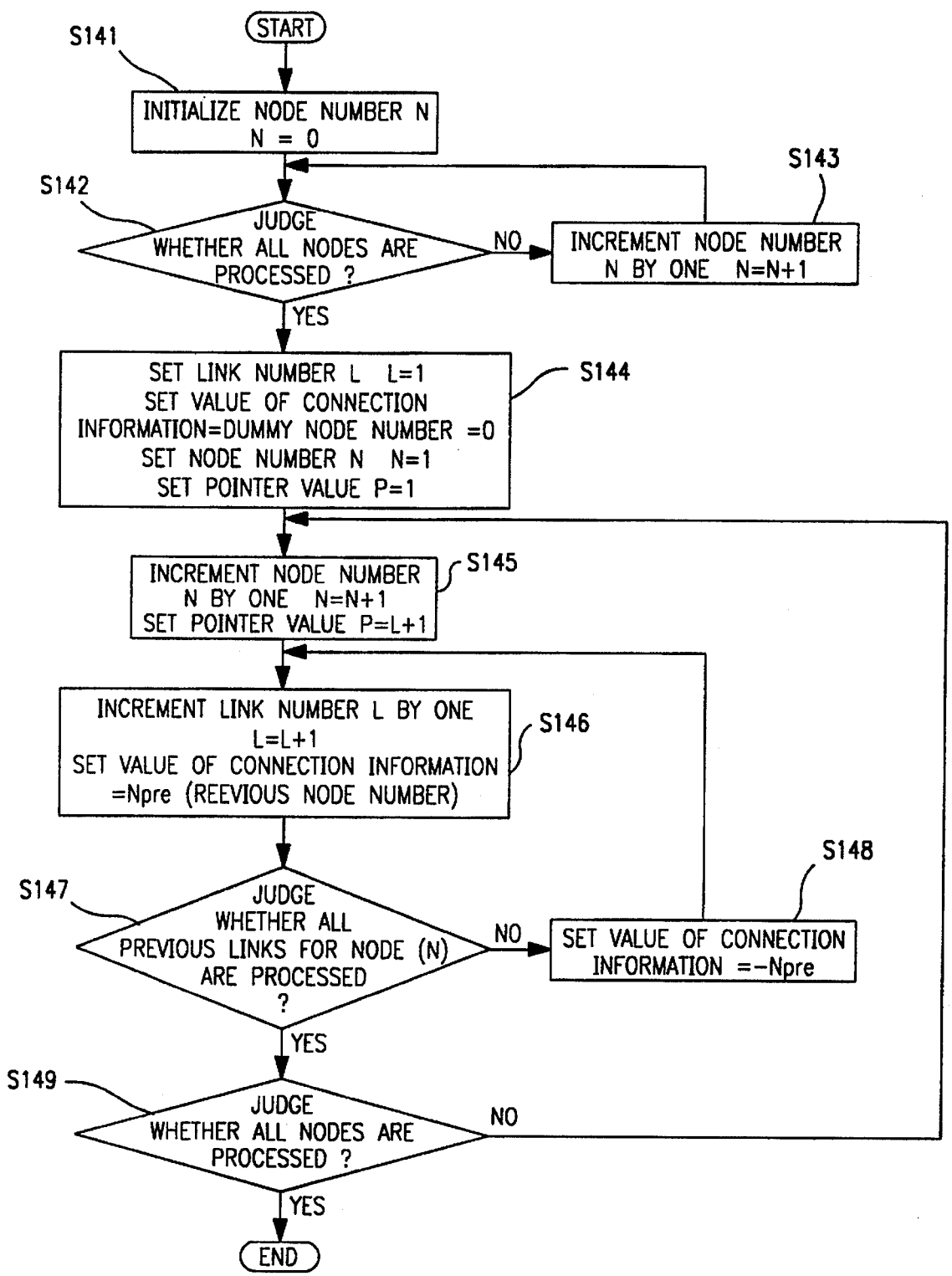
FIG. 16 shows an algorithm for storing a data structure based on a network structure according to a point-based method.

FIG. 16 shows an algorithm for creating a data structure from a network structure by the pointer-based method.

START: Upon the start of creating a data structure from a network structure, step S141 is invoked.

Step S141: Initialize node number N to zero. (N=0) Then, proceed to step S142.

Step S142: Judge whether or not all nodes are processed. If the judgment is affirmative (YES), skip to step S144. If the judgment is negative (NO), proceed to step S143.

Step S143: Increment node number N by one [1]. (N=N+1) Then, revert to step S142.

Step S144: Set link number L to one [1]. (L=1) Set the value of connection information equal to dummy node number, which is zero [0]. Set node number N to one [1]. (N=1) Set pointer value P to one [1]. (P=1) Then, proceed to step S145.

Step S145: Increment node number N by one [1]. (N=N+1) Set pointer value P to link number L plus one [1]. (P=L+1) Then, proceed to step S146.

Step S146: Increment link number L by one [1]. (L=L+1) Set the value of connection information equal to Npre, the previous node number. Then, proceed to step S147.

Step S147: Judge whether or not all previous links for node (n) are processed. If the judgment is negative (NO), proceed to step S148. If the judgment is affirmative (YES), skip to step S149.

Step S148: Set the value of connection information equal to −Npre.

Step S149: Judge whether or not all nodes are processed. If the judgment is negative (NO), revert to step S145. If the judgment is affirmative (YES), end the process. [END]

FIGS. 17(a)–17(f) show steps of creating a data structure from a network structure by the pointer-based method.

Part (a): Labels A, B, C, D and E are attached to respective nodes in a network structure.

Part (b): Node numbers N are assigned to all nodes in the network structure.

Part (c): Link information establishes the correspondences between link numbers L, which are one [1], two [2] and three [3], and values of connection information, (i.e. previous node numbers,) which are zero [0], one [1], one [1]; and node information establishes the correspondences between the node numbers N and the labels A, B and D.

Part (d): Link information establishes the correspondences between the link numbers L, which are four [4] and five [5], and the values of connection information, which are minus two [−2] and minus three [−3]. When the value of connection information is negative, only the link number L is increased, whereas the node number N is not.

Part (e): The value of connection information for the link whose link number L is six [6] is one [1].

Part (f): Therefore, the node number N is increased to five [5], and the value of connection information, which is four [4], corresponds to the link whose link number L is seven [7]. Thus, the "link information" and the "node information" are stored e.g. in a memory.

Figure 18:
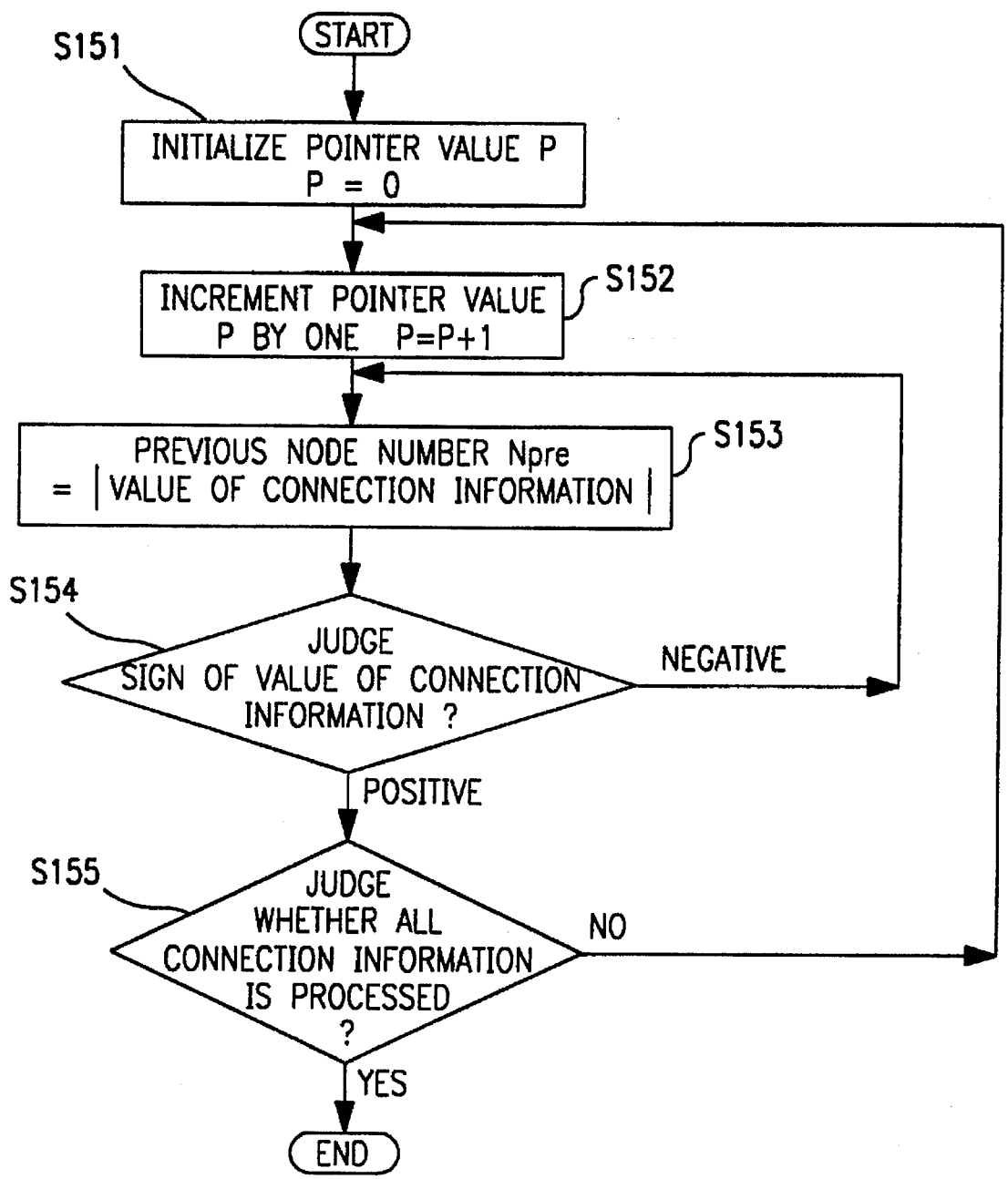
FIG. 18 shows an algorithm for restoring a network structure based on a data structure according to a pointer-based method.
Figure 19A:
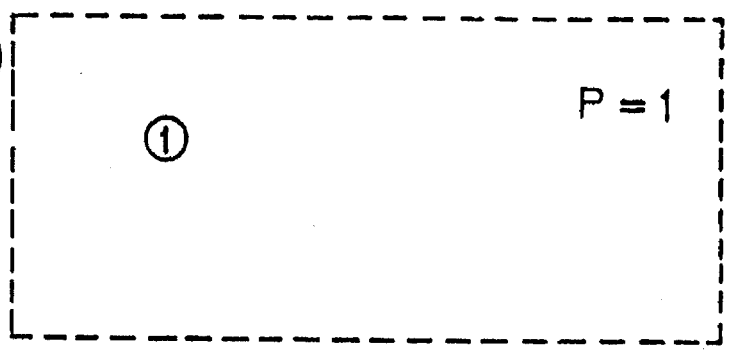
FIGS. 19(a)-19(d) show an explanatory view of a process of restoring a network structure based on a data structure according to a pointer-based method.
Figure 19B:
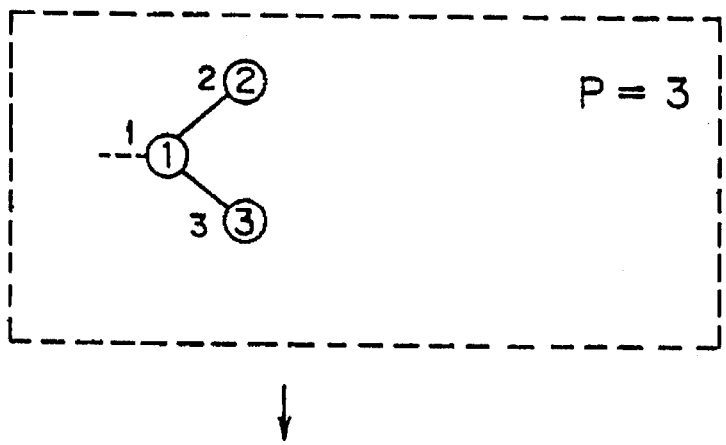
Figure 19C:
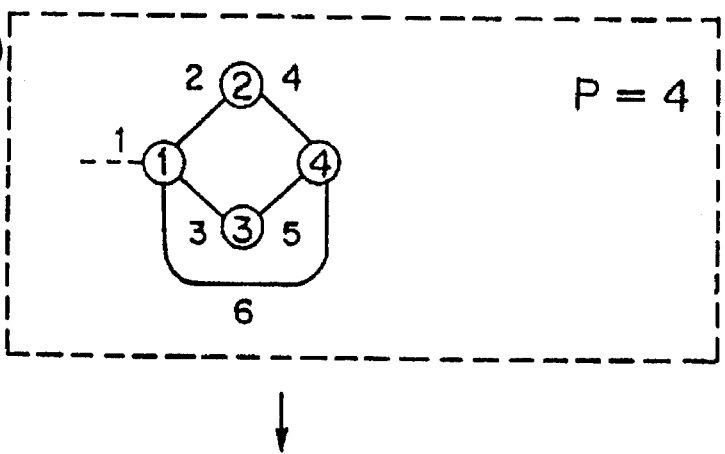
Figure 19D:
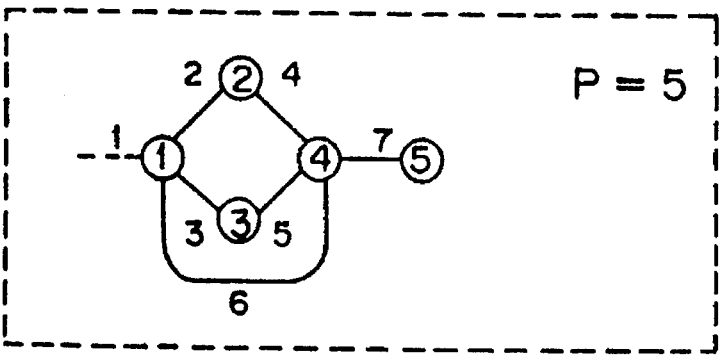

FIG. 18 shows an algorithm for restoring a network structure from a data structure by the pointer-based method.

In FIG. 18, a pointer value P stores the node number N of the next node.

START: Upon start of the process, step S151 is invoked.

Step S151: Initialize the pointer value P to zero [0]. (P=0) Then, proceed to step S152.

Step S152: Increment the pointer value P by one [1]. (P=P+1) Then, proceed to step S153.

Step S153: Because the link number L of the link previous to the node whose node number N is one [1] is also one [1], obtain the value of connection information (i.e. the node number N of the previous node), which is zero [0], corresponding to the link whose link number L is one [1] from the link information shown in FIG. 17(d). This is expressed in FIG. 18 as, Npre=|value of connection information|.

Then, proceed to step S154.

Step S154: Judge the sign of the value of the connection information. If the sign is negative, revert to step S153. If the sign is positive, proceed to step S155.

Step S155: Judge whether or not all connection information is processed. If the judgment is negative (NO), revert to step S152. If the judgment is affirmative (YES), end the process. [END]

That is, when the judgment in step S155 is negative (NO), the pointer value P is incremented by one [1] in step S152, thereby increasing the node number N of the next node from one [1] to two [2].

Figure 17A:
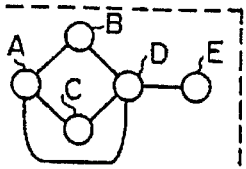
FIGS. 17(a)-17(f) show an explanatory views of a process of forming a data structure based on a network structure according to a pointer-based method.
Figure 17B:
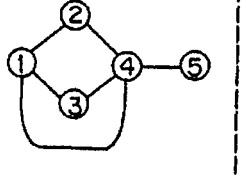
Figure 17C:
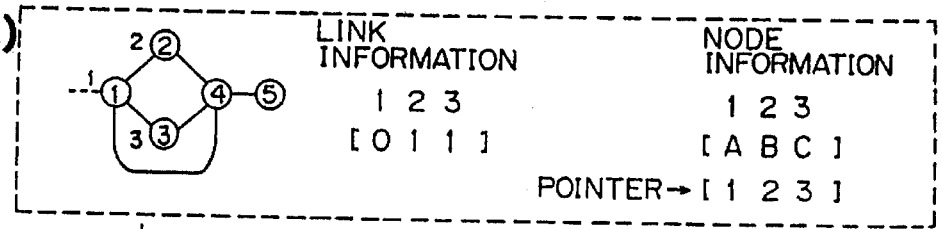
Figure 17D:
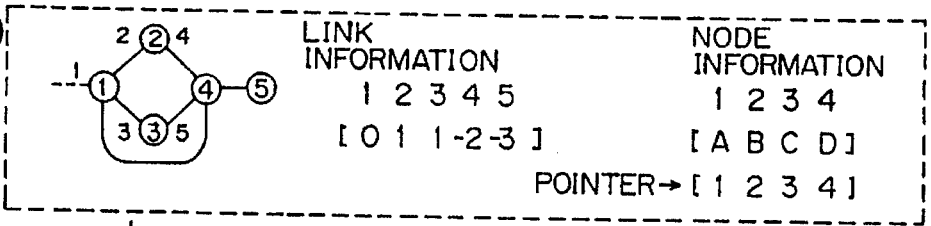
Figure 17E:
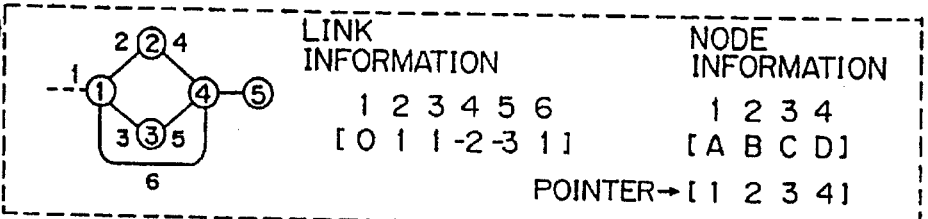

Also, when the value of connection information is negative, e.g., minus two [−2], in step S154, only the link number L is increased, whereas the node number N is not, as shown in FIG. 17(d). This indicates that a plurality of links branch out from the next node.

FIGS. 19(a)–19(d) show steps of restoring a network structure from a data structure by the pointer-based method.

Because the pointer value P corresponds to the node number N of the next node, the link number L of a link branching from the next node having the node number N is searched from a data structure shown in FIG. 11(b). The FIG. 11(b) shows information relating to pointers and provides that node numbers 1, 2, 3, 4 and 5 correspond to previous link numbers 1, 2, 3, 4 and 7 through pointers, respectively.

The value of connection information (that is, information relating to the previous node) for the node whose node number N is one [1] is the first information of FIG. 10(b), namely, zero [0]. That is, the node whose node number N is one [1] has a previous node whose value is zero [0]. Because the value zero [0] is not a negative value, the node whose node number N is one [1] has only one previous node.

The value of connection information for the node whose node number N is two [2] is the second information of FIG. 10(b), namely, one [1]. Therefore, the node whose node number N is two [2] has a previous node whose value is one [1]. Because the value one [1] is not a negative value, the node whose node number N is two [2] has only one previous node.

Likewise, the node whose node number N is three [3] has a previous node whose value is also one [1]. Because the value one [1] is not a negative value, the node whose node number N is three [3] has only one previous node.

The value of connection information for the node whose node number N is four [4] is the fourth information of FIG. 10(b), namely, minus two [−2]. Therefore, the node whose node number N is four [4] has a previous node whose value is two [2]. Since minus two [−2] is a negative value, the node whose node number N is four [4] has another previous node. Therefore, the value of fifth connection information, namely, minus three [−3] also provides a previous node number. Namely, the node whose node number N is four [4] also has a previous node whose value is three [3]. Since minus three [−3] is a negative value, the node whose node number N is four [4] has yet another previous node. Therefore, the sixth connection information, namely, one [1] also provides a previous node number. Namely, the node whose node number N is four [4] also has a previous node whose value is one [1]. Since one [1] is a positive value, the node whose node number N is four [4] has no more previous nodes. That is, the node whose node number N is four [4] has three [3] previous nodes whose values are two [2], three [3] and one [1].

The value of connection information for the node whose node number N is five [5] is the seventh information of FIG. 10(b), namely, four [4]. Therefore, the node whose node number N is five [5] has a previous node whose value is four [4]. Because the value four [4] is not a negative value, the node whose node number N is five [5] has no more previous nodes and this is the one and only previous node.

With the above background information, FIGS. 19(a)–19(d) are explained below in more detail.

Figure 17F:
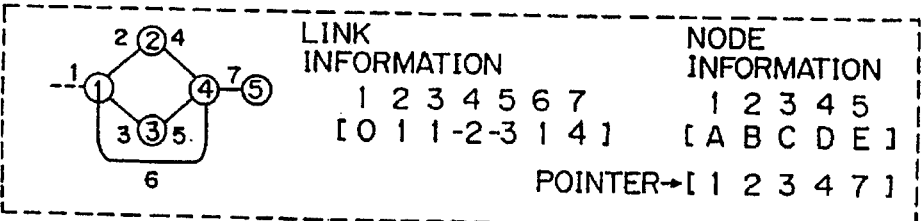

Part (a): The pointer value P is incremented from zero [0] to one [1]. That is, the next node is {1}. The pointer value P is one [1], i.e., P=1. Because the link number L of the link connected to node {1} is one [1], the value of connection information for the link whose link number L is one [1] is obtained. The value of connection information is zero [0], as shown in FIG. 17(f). Because at this time the node number N has the dummy node number zero [0], zero [0] is stored as the node number N. Thus, zero [0] is substituted into the node number N of the previous node.

Part (b): The pointer value P is counted up to two [2], because zero [0] is not a negative value. Because the link number L of the link connected to the node whose node number N is two [2] is also two [2], the value of connection information is one [1]. Because the value of connection information is positive, the pointer value P is counted up to three [3], i.e. P=3. Then, the link number L, which is three [3], is obtained from the node number N, which is three [3]. Then, the value of connection information is one [1]. Therefore, the pointer value P must be four [4], i.e., P=4.

Part (c): The link numbers L of the links connected to the next node whose node number N is four [4] are four [4], five [5] and six [6]. Because the value of connection information of the link whose link number L is four [4] is minus two [−2] and the value of connection information of the link whose link number L is five [5] is minus three [−3], the node numbers N of the previous nodes are two [2] and three [3], respectively.

Because the value of connection information is negative, the pointer value P is not counted up, and the value of connection information, which is minus three [−3], is read. This indicates that the node number N of the previous node is three [3]. When the pointer value P is not counted up, the value of Connection information, which is one [1], of the link whose link number L is six, [6] is obtained.

Part (d): Because the value of connection information is positive, the pointer value P is counted up to five [5], i.e., P=5. Thus, the previous links from the node whose node number N is five [5] are searched. The value of connection information, which is four [4], is read from the link whose link number L is seven [7].

What is claimed is:

1. A network data storing method used in a data processor, for managing network data in a network data structure configured by linking a plurality of nodes with a plurality of links specifying connections between said nodes, each one of said nodes expressing a basic unit of data in said data processor, said network data storing method comprising:

a step of assigning link identifiers, having distinct and unique values, to respectively corresponding links;

a step of holding, as information data indicating a connection in the network data structure, one of a previous and a next node identifier of each said link, said previous node identifier indicating a previous node in a previous direction of a corresponding link and said next node identifier indicating a next node in a next direction of said corresponding link;

a step of successively storing in said data processor the information data of a plurality of said plurality of links having a same node in the reverse direction to a direction used for the information data;

a step of selecting one of the link identifiers of said plurality of said plurality of links and assigning the value of said one link identifier as the value of a node identifier of the same node; and a step of accessing the basic unit of data corresponding to one of said nodes indicated by the information data of said plurality of said plurality of links.

2. The network data storing method for a data processor according to claim 1, further comprising:

a step of distinguishing said previous direction from said next direction by attaching a temporary direction indicator to a non-directional link.

3. The network storing method for a data processor according to claim 2, further comprising:

a step of using the link identifiers as link numbers uniquely assigned to respectively corresponding links; and a step of using a node number, having a same value as one of a value of said link number of a given link connecting the corresponding previous node to the corresponding next node, a maximum and a minimum value of the link numbers of links connecting the corresponding previous node to the corresponding next node, as a node identifier used as the information data.

4. The network data storing method for a data processor according to claim 3, further comprising:

a step of distinguishing each one of said plurality of said plurality of links by attaching one of a positive and a negative sign to said node number used as the information data of said each link, said positive sign and negative sign indicating whether said each link has the same node in the reverse direction as a successive link corresponding to successive information data.

5. The network data storing method for a data processor according to claim 1, wherein:

said network data in the network structure are stored in a dictionary, having a network form, of a voice recognition apparatus.

6. A network data storing method for a data processor, for managing the network data in a network data structure configured by linking a plurality of nodes with a plurality of links specifying connections between said nodes, each one of said nodes expressing a basic unit of data in said data processor, said network data storing method comprising:

a step of attaching a node identifier and a link identifier, respectively, to each said node and each said link;

a step of holding, as information data indicating a connection in the network data structure, one of a previous and a next node identifier of each said link, said previous node identifier indicating a previous node in a previous direction of a respective corresponding said link and said next node identifier identifying a next node in a next direction of said respective corresponding said link; and a step of successively storing in said data processor the information data of a plurality of said plurality of links having a same node in the reverse direction to a direction used for the information data; and a step of accessing the basic unit of data corresponding to one of said nodes indicated by the information data of said plurality of said plurality of links.

7. A network data storing method for a data processor, for managing the network data in a network data structure configured by linking a plurality of nodes with a plurality of links specifying connections between said plurality of nodes, each one of said plurality of nodes representing a basic unit of information data in said data processor, each link connecting a respective previous node with a respective next node and pointing from said respective next node to said respective previous node, said network data storing method comprising the steps of:

storing said basic unit of information data for each of said plurality of nodes in said data processor;

assigning each link a link number corresponding to said each link;

assigning each node a node number corresponding to said each node;

storing said link numbers and respective associated node numbers in said data processor, each said respective associated node number being indicative of said respective previous node of said link corresponding to said respective associated link number; and accessing the basic unit of information data corresponding to one of said plurality of nodes, ones of said link numbers, of said corresponding links having a same corresponding next node, being stored consecutively in said data processor, a first sign of each of said respective associated node numbers indicating that the link of said corresponding link number has the same corresponding next node as the link of the successively stored link number and a second sign opposite said first sign of each of said respective associated node numbers indicating that the link of said corresponding link number has a different corresponding next node as the link of the successively stored link number.

8. A network data storing method used in a data processor, for managing a network data in a network data structure configured by linking a plurality of nodes with a plurality of links specifying connections between said plurality of nodes, each one of said plurality of nodes representing a basic unit of information data in said data processor, each link connecting a respective previous node with a respective next node and pointing from said respective next node to said respective previous node, said network data storing method comprising the steps of:

storing said basic unit of information data for each of said plurality of nodes in the data processor;

assigning to each link a distinct and unique link number corresponding to said each link;

assigning to each node a distinct and unique node number, wherein if only one link points from said one node, said corresponding node number of said one node is assigned a same value as a corresponding link number of said corresponding one link, and if at least two links point from said one node, said corresponding node number of said one node is assigned a same value as a corresponding link number of one of said at least two links;

successively storing, in said data processor, ones of said link numbers, of said corresponding links having a same next node, along with said node numbers of said respective previous nodes of said corresponding links; and accessing the basic unit of information data corresponding to one of said plurality of nodes.

9. A network data storing apparatus for managing network data in a network data structure configured by linking a plurality of nodes with a plurality of links specifying connections between said nodes, each one of said nodes expressing a basic unit of data, said network data storing apparatus comprising:

assigning means for assigning link identifiers, having distinct and unique values, to respectively corresponding links;

storage means for successively storing information data of a plurality of said plurality of links having a same node in one of a previous and a next direction of said plurality of said plurality of links, the information data indicating a connection in the network data structure and including a node identifier of a node in the reverse direction of each said link, said reverse direction being a direction opposite to a direction where the same node is located;

selecting means for selecting one of the link identifiers of said plurality of said plurality of links, and for assigning the value of said one link identifier as the value of a node identifier of the same node; and accessing means for accessing the basic unit of a data corresponding to one of said nodes indicated by the information data of said plurality of said plurality of links.

* * * * *

UNITED STATES PATENT AND TRADEMARK OFFICE
CERTIFICATE OF CORRECTION

PATENT NO. :     5,655,134
DATED       :     August 5, 1997
INVENTOR(S) :    Yasushi YAMAZAKI It is certified that error appears in the above-indentified patent and that said Letters Patent is hereby corrected as shown below:

<u>Column 5</u>

Line 20, "Go" should be --to--.

<u>Column 7</u>

Line 59, "as" should be --in--.

<u>Column 8</u>

Line 50, "10($\ell$)" should be --10(a)--.

<u>Column 11</u>

Line 2, "11(d)" should be --11(a)--.

<u>Column 12</u>

Line 55, "Fig. 17(d)" should be --Fig. 17(f)--.

Signed and Sealed this

Twenty-first Day of October 1997

Attest:

BRUCE LEHMAN

Attesting Officer          Commissioner of Patents and Trademarks